Nov. 4, 1969   S. SABADISHIN ET AL   3,475,958
ANGLE OF ATTACK INDICATOR

Original Filed March 16, 1967   2 Sheets-Sheet 1

INVENTOR
STEVE SABADISHIN and
BY MICHAEL ARGENTIERI

Popper, Bain & Bobis

ATTORNEYS

United States Patent Office 3,475,958
Patented Nov. 4, 1969

3,475,958
ANGLE OF ATTACK INDICATOR
Steve Sabadishin, Box 309, Pluckemein, N.J. 07978, and Michael Argentieri, 25 Tenney Road, West Orange, N.J. 07052
Continuation of application Ser. No. 624,672, Mar. 16, 1967. This application Dec. 9, 1968, Ser. No. 792,881
Int. Cl. G01c 21/20
U.S. Cl. 73—180                      3 Claims

ABSTRACT OF THE DISCLOSURE

An angle of attack indicator in which the deflection of a planar vane in response to its angle of attack on a fluid medium is transmitted to a magnet which moves to produce a succession of visual signals, the signals being without nulls, but always rendering one readout signal or two readout signals in transition from one signal to another, but never three, by reason of the limited zone of magnetic influence with respect to magnetic electro-switches.

Cross reference to related application

This application is a continuation of application Ser. No. 624,672 filed Mar. 16, 1967, now abandoned.

BACKGROUND OF INVENTION

Field of invention

The present invention relates to an angle of attack system as embodied for measuring the direction of air flow relative to an airfoil for the purpose of displaying said direction of air flow to the pilot of an aircraft. The "angle of attack" is the term given to the angle of air flow relative to the chord line of a wing.

In aerodynamics, an airfoil's lift is associated with the direction of the relative wind. This angle varying for several classic airfoil cross-section designs, however, remaining substantially within the limits of −5 to +25 degrees, with most airfoil sections stalling (losing lift) when said angle of attack exceeds +18 degrees.

This information of angle of attack is very important to the safe and expeditious handling of an aircraft. The pilot of a particular aircraft can determine the stalling angle for his aircraft empirically (by subjecting the aircraft to a wing stall) by the use of this angle of attack system and can, therefore, avoid this region (angle) when maneuvering to insure safe flight conditions. To expeditiously handle his aircraft, a pilot also would like to know the best angle for cruise, climb, letdown, turns, etc. This information can also be extracted from this angle of attack system with precision and repeatability.

Description of prior art

There are several known embodiments of angle of attack measuring systems. Such embodiments employing syncro transmitting and receiving systems, potentiometer transmitters and electrical meter type indicators, etc. All of these common systems requiring either alternating current (400 cycle power) or precise regulated direct current power. These types of systems tend to be expensive and complex and only operate properly over a very narrow range of voltage and frequency variations which limit their accuracy and reliability. Further, A.C. power systems are only found on larger type aircraft.

SUMMARY OF INVENTION

The present angle of attack system will operate accurately and reliably from any raw (unregulated) direct current (D.C.) source and can be equally employed on all size aircraft. A portable D.C. supply (a battery, for example) can also be employed for example in the installation of this angle of attack system to a glider.

An object of this invention is to aid the pilot during the critical phases of takeoff and landing. The normal procedure in takeoff is to head the aircraft down the runway at full throttle and accelerate the aircraft to what is known as the takeoff airspeed, at which time a slight mount of back pressure is applied to the control column. The procedure is then to await the airspeed to further increase to the point of providing sufficient lift to support the aircraft in flight. The lift-off point employing this procedure is rather uncertain, however, and can be unnecessarily delayed by employing too little back pressure or too much back pressure to the control column. The effect of too little back pressure is that the aircraft must attain a higher than normal airspeed before sufficient lift is obtained. This can represent a rather long time delay and consequently the use of additional runway. Too much back pressure to the control column will result in a decrease in the aircraft's forward velocity, due to the increase is drag, resulting in a loss of lift and an aborted takeoff.

Since the wing lift is related to its angle of attack, displaying this information to the pilot can improve his takeoff procedure and technique by making his control function positive. The takeoff procedure utilizing the angle of attack information would be to proceed down the takeoff runway and accelerate to the takeoff airspeed recommended for the particular aircraft and then apply a steadily increasing back pressure to the control column, while referring to the angle of attack indicator. The aircraft will, utilizing this procedure, become airborne when its wing angle of attack is the correct value for sustaining lift. This procedure is accomplished in a few seconds and will result in the aircraft becoming airborne in the least distance and with a positive reference to the actual wing lift.

During the landing phase, it is important to fly the aircraft at the minimum maneuvering airspeed, usually 30% above the stall airspeed. This actual point (airspeed) being compromised at the discretion of the pilot to compensate for varying aircraft load conditions, and weather conditions such as wind velocity and wind shear (gusts). However, since the airspeed, by nature, has a great deal of lag in its response, (also attributed to the aircraft's inertia), it is difficult for the pilot to maintain constant airspeed and, therefore, difficult to maintain a constant glide angle. Since the angle of attack system is instantaneously responsive, it is relatively easy for the pilot to maintain the aircraft at the best approach angle of attack and, therefore, a constant glide angle. The pilot will also be able to fly this aircraft closer to the stall angle with confidence such as would be necessary if he were attempting to land in a relatively small length field.

A further object of this invention is to give the pilot of an aircraft a cockpit indication of angle of attack which he can interpret easily, which has no inherent inertial lag to its indication, and which can be mounted in the pilot's field of view as he looks out of the aircraft windshield.

It has been found that a magnetic angle of attack signal always shows a single signal, or two signals in transition from one signal to another; i.e. never less than one, never more than two, so that the navigator is always informed of the precise angle of attack.

THE DRAWINGS

PREFERRED EMBODIMENT

Figure 1:
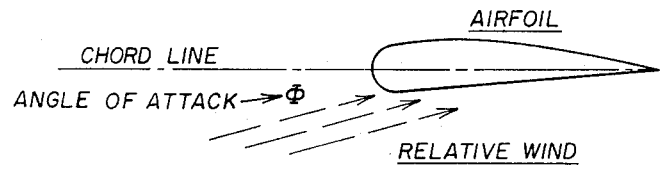
FIGURE 1 is a schematic view showing the relative position of an airfoil in cross-section, with respect to the relative wind, the chord line of the airfoil, and the angle of attack.
Figure 2:
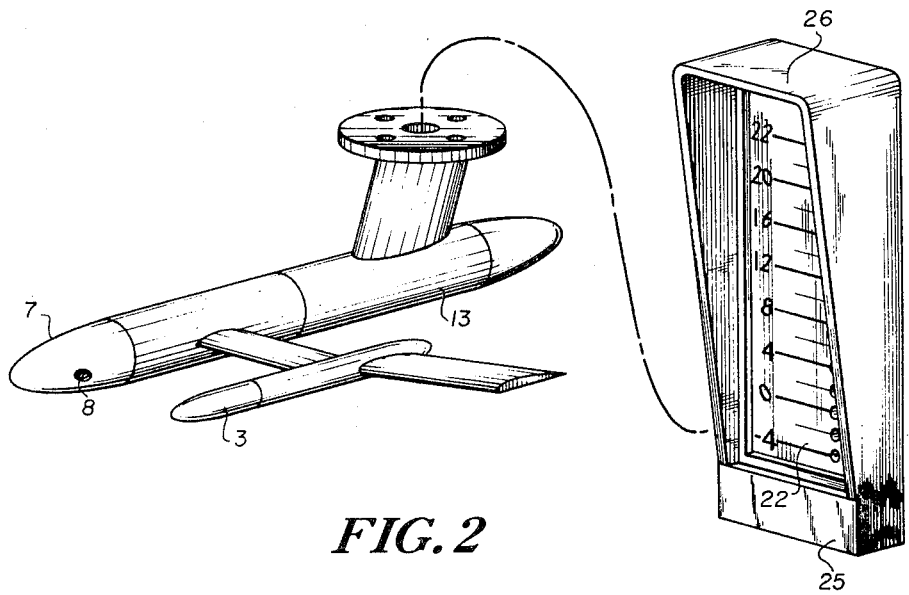
FIGURE 2 is a plan view of the angle of attack indicator.
Figure 3:
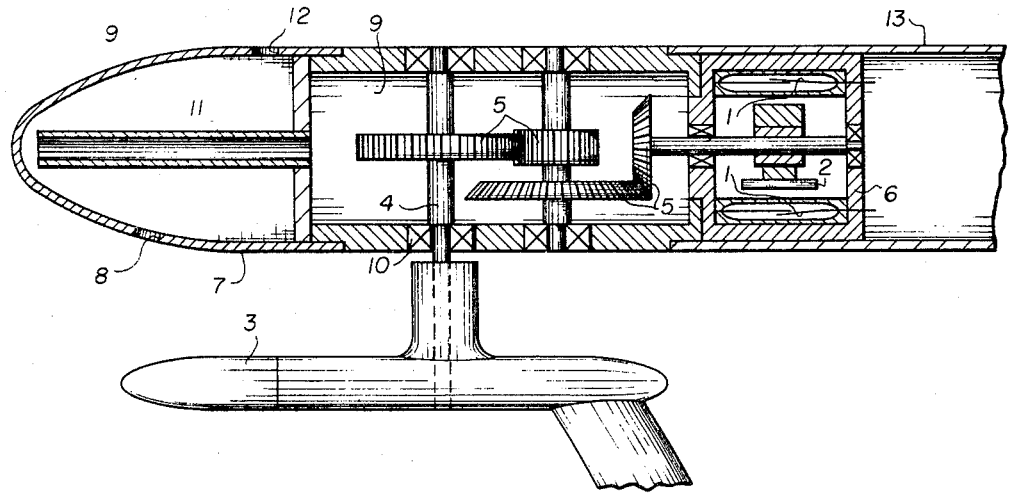
FIGURE 3 is a vertical sectional view of the transmitter portion of the angle of attack indicator.

*Transmitter.*—Referring to FIGURE 3, there is shown a cross-section of the transmitter showing the various elements. A circular arrangement of magnetically sensitive reed switches 1 circularly disposed such that the magnetic flux from the permanent magnet 2 will cause the closure of said switches for every one degree circular displacement of the magnet. Also the circular arrangement, sensitivity of the reed switches, and field strength of the permanent magnet arrangement are such as to cause the closure of a red switch within ½ degree of its circularly disposed position and an opening of the reed switch within ½ degree past its circularly disposed position.

The actuating magnet 2 is caused to rotate in synchronism with the airflow sensing vane 3 through the shaft 4 secured to the vane and the step-up gear ratio 5. This ratio being an exact 1:12 step-up in this embodiment to transform the small vane angle movement of 30 degrees into a full 360 degrees movement of the permanent magnet 2 in the sensing unit 6.

The nose cone 7 is shaped to give the least disturbance to the air and contains hole 8 which allows ram air to stagnate and the air pressure to build-up above ambient in the chambers 9. This is done to insure a higher pressure internally within the systems, and therefore, prevent the ingestion and collection of rainwater within the unit through the vane drive shaft bearings 10. Tube 11 is made sufficiently long so as to have its opening ahead of hole 8 to prevent ram water droplets from entering this opening. Hole 12 acts as an air bleed and water drain. The transmitter is attached to the outside of the aircraft wing by means of tube and mount 13. Tube 13 can be made any length to suit the particular installation.

Figures 4, 5, 6:
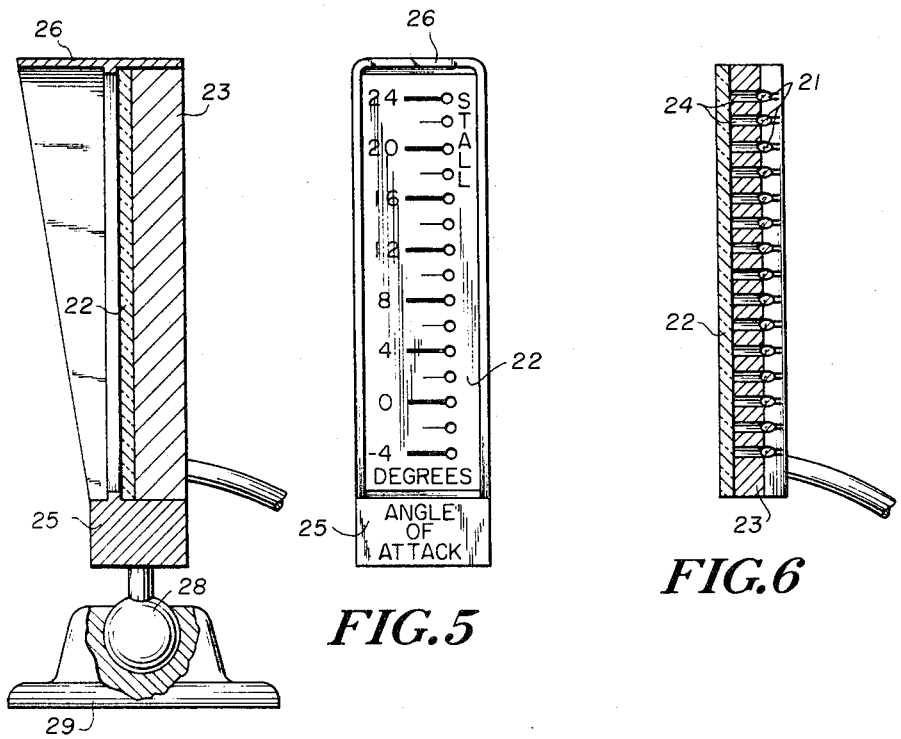
FIGURE 4 is a side elevational view of the indicator and mounting.
FIGURE 5 is a front elevational view of the indicator.
FIGURE 6 is a partial side vertical sectional view of the indicator.

*Indicator.*—Referring to FIGURE 4, the indicator comprises a number of low voltage long life miniature lamps 21 in one to one correspondence with the number of switches contained in the transmitter unit. A suitable scale and graduations is provided 22 to give a numerical indication of angle of attack.

The construction of the lamp housing 23 which is opaque is such that the lamps are positioned at the back end of their respective mounting tubes or holes 24. The observer, therefore, views each lamp through a long dark tube or hole 24, resulting in the maximum contrast between the lamp brightness and the ambient light.

The angle of attack system is so constructed that the angle indication of relative wind results in the illumination of the corresponding light bulb, which are spaced at one degree intervals. The transmitter switches are also spaced at one degree intervals. The magnet strength and switch physical position and sensitivity is so arranged that the indicator will always have at least one light illuminated at all times. Progressively first one and then two lights will be illuminated as the angle of relative wind increases or decreases. For example, as the relative wind (angle of attack) increases from the one degree position, the one degree light will be the only light illuminated when the one degree switch is in the closed position. As the transmitter magnet advances to the 1½ degree position, the one degree and the two degree light will both be illuminated. A further advancement of the transmitter magnet will result in the extinguishing of the one degree light but a continual illumination of the two degree light, etc.

The vertical embodiment of the indicator scale is employed to satisfy the human engineering aspects of the man-machine relationship. It is easy to think of the aircraft's angle of attack as being too high and the corrective action as pushing forward on the control column or applying more engine power. As we observe, the indicator lights progressing (as they light up) toward the top of the indicator (toward the stall region) the proper corrective control action of pushing the control column forward to reduce the angle of attack is quite evident.

The indicator housing 25 is so constructed as to provide an integral sun shade 26 for the indicator scale. The ball and socket joint 28 and mount 29 are provided so that the observer may position the indicator normal to his line of sight. Also, the same physical indicator may be employed by the pilot or the co-pilot when desired by the flexibility afforded by the ball joint which will also allow the indicator to be positioned to the left or right.

The foregoing description is merely intended to illustrate an embodiment of the invention. The component have been shown and described. They each may have substitutes which may perform a substantially similar function; such substitutes may be known as proper substitutes for the said components and may have actually been known or invented before the present invention.

What is claimed:
1. An angle of attack indicator
   (a) a mounting for rotatably holding an axle,
   (b) an axle rotatable on the mounting,
   (c) a vane rigidly attached to the axle and deflectable in response to the angle of attack,
   (d) a magnet,
   (e) means connecting the magnet to the axle to rotate the magnet in correspondence to the deflection of the vane,
   (f) a plurality of magnetic electroswitches, each successively within the zone of magnetic influence of the magnet as it is rotated,
   (g) the zone of magnetic influence sufficiently wide to actuate only one electroswitch when it is disposed in general registration with that one electroswitch, and to actuate one electroswitch and also only one adjacent electroswitch when the magnet is deflected out of general registration with that one electroswitch toward the one adjacent electroswitch, but the zone of magnet influence being sufficiently narrow to influence no more than two electroswitches,
   (h) a plurality of visual indicators each operably connected to one electroswitch.
2. The device according to claim 1, and
   (a) an opaque shield for the visual indicators,
   (b) generally tubular viewing tubes extending from apertures in the shield, each having a viewing axis directed generally toward the eye of an observer adjacent to the device,
   (c) the visual indicators positioned separately on the viewing axis of one of the tubes.
3. The device according to claim 2 and a universal mounting for the opaque shield and viewing tubes whereby the viewing axes may be adjusted toward the eye of an observer.

References Cited
UNITED STATES PATENTS 1,342,944   6/1920   Danielson _____ 73—180
3,364,740   1/1968   Wong _____ 73—188

DONALD O. WOODIEL, Primary Examiner

U.S. Cl. X.R.

73—188